United States Patent

Libal et al.

[11] Patent Number: 5,827,485
[45] Date of Patent: Oct. 27, 1998

[54] REACTOR

[75] Inventors: Klaus Libal; Walter Fierlbeck; Ulrich Von Gemmingen, all of München, Germany

[73] Assignee: Linde Aktiengesellschaft, Wiesbaden, Germany

[21] Appl. No.: 539,831

[22] Filed: Jun. 18, 1990

[30] Foreign Application Priority Data

Jun. 16, 1989 [DE] Germany .......................... 39 19 750.6

[51] Int. Cl.⁶ ...................................................... B01J 8/02
[52] U.S. Cl. .......................... 422/179; 422/181; 422/218; 422/221
[58] Field of Search .............................. 55/198, 208, 316, 55/319; 422/192, 194, 195, 220, 179, 181, 218, 221

[56] References Cited

U.S. PATENT DOCUMENTS

| | | |
|---|---|---|
| 1,429,856 | 9/1922 | Etter . |
| 2,517,525 | 8/1950 | Cummings . |
| 3,620,685 | 11/1971 | Rogers ..................................... 422/192 |
| 4,541,851 | 9/1985 | Bosquain et al. . |
| 4,568,523 | 2/1986 | Wijffels et al. .......................... 422/220 |
| 4,590,045 | 5/1986 | van der Wal et al. ................... 422/220 |
| 4,673,423 | 6/1987 | Yumlu ....................................... 55/319 |

FOREIGN PATENT DOCUMENTS 546285  7/1942  United Kingdom .

OTHER PUBLICATIONS

Perry, R.H. "Perry's Chemical Engineer's Handbook" 6th ed., New York, McGraw–Hill Book Company, pp. 6–87 to 6–88 (1984).

Primary Examiner—Jeffrey Snay
Attorney, Agent, or Firm—Millen, White, Zelano, & Branigan, P.C.

[57] ABSTRACT

A reactor, for example, for adsorption processes, is described which is designed essentially cylindrically and is symmetrical with respect to an essentially vertical axis. The reactor is bounded by a shell. A circular bed filled with free-flowing material (e.g., an adsorbent or catalyst) is positioned inside the shell. The free-flowing material is contained within an inner basket and an outer basket and supported by a bottom support member from below. Both baskets are rigidly connected in the radial direction and rigidly connected at their lower end to the shell. At least one of the two baskets is both expandable in the axial direction and rigidly connected at its upper end to the shell.

27 Claims, 4 Drawing Sheets

REACTOR

BACKGROUND OF THE INVENTION

The invention relates to a reactor designed essentially cylindrically and is symmetrical around an axis running essentially vertically. The reactor has a shell and an annular bed positioned inside the shell. The bed is filled with free-flowing material contained in a space defined by an inner basket and an outer basket. At its lower end, the bed is supported by a bottom support. The two baskets are connected rigidly in the radial direction and rigidly at their lower end to the shell.

There is a broad field of use for such reactors. They can be used for a wide variety of reactions involving a gas and an active material, the latter being present in a free-flowing form. The active material, for example, can be an adsorbent or a catalyst. The reactor can contain several types of active material and also contain more than one bed. For example, a first bed can be concentrically surrounded by a second adjacent bed.

During the active operation phase, a gas to be treated is fed in a substantially radial direction with respect to the axis of symmetry of the reactor through the bed of active, free-flowing material. For example, the gas can be fed to a space between the shell and the outer basket and removed from a space within the inner basket. In the case of an adsorption process, the activity of the active material (i.e., an adsorbent) decreases with increasing duration of operation. Therefore, the adsorbent must be regenerated at regular intervals. During the regeneration phase, a regeneration gas is conducted through the bed of active material. In comparison to the gas being treated during the adsorption phase, the regeneration gas exhibits a different chemical composition and/or a different thermodynamic state.

The process can, e.g., involve adsorptive separation of gas mixtures of adsorptive removal of undesirable components from a gas mixture to be purified. A practical example of the latter is separation of water and/or carbon dioxide from air which is to be treated in a low temperature air separation unit. In such a case, the free-flowing material introduced into the bed acts as an adsorbent and, for example, can comprise molecular sieves.

During the reaction or adsorption phase, the air to be purified is fed through the bed, and water and/or carbon dioxide are thereby adsorbed by the active material. During the regeneration phase, the adsorbed substances removed from the air are desorbed by a regeneration gas (for example, nitrogen) which is conducted through the adsorbent bed. In this case, generally different temperatures and/or pressures prevail during the regeneration phase in comparison to the adsorption phase.

A central problem in the design of a reactor of this type is the substantial temperature differences between the different operating phases. Thus, in the regeneration phase—to stay with the example of an adsorption process—regeneration gas flows in at a relatively higher temperature and causes a large temperature change to occur in a short period of time and also induces the formation of large spatial temperature gradients within the bed. The related thermal length changes of the baskets in the radial and/or axial directions result in mechanical problems during normal operation due to the relative movements between the free-flowing material and the baskets. An undesirable wear of the bed is connected with such movements. Furthermore, in the case of interruptions of operation (e.g., shutdowns or breakdowns) and the related greater temperature fluctuations, very substantial mechanical damage can occur. Similar problems also occur when such a reactor is used for catalytic reactions, especially during operation interruptions and start-up phase.

Temperature fluctuations of up to 200–250 K, typically 130–140 K from a basis of about 20° C. can occur. If at least one basket is free, resultant induced axial length changes can be, for example, up to about 10 mm for a total axial length of about 3 m.

To overcome these difficulties, different methods have been developed to avoid the thermally caused length changes of the baskets which define or limit the bed. One of these proposals is known from AT-E-19 595 (FIG. 4). In this system, it is proposed that in a reactor of the type previously mentioned, the baskets are supported on the bottom of the reactor and permitted the possibility of upward expansion. At their upper ends, the baskets are secured only laterally (i.e., radially) by circular guide walls.

With this design, the baskets can expand in the axial direction when heated and contract again when cooled. Thus, mechanical stresses due to thermal length changes resulting in a change of the radial dimensions of the bed and associated changes in the level of the bed material are prevented. However, axial movement of the basket is possible, and this causes undesirable wear of the free-flowing material. Moreover, at extremely high temperature fluctuations, axial movement can impose the danger of deformations within the bed. Thus, the free-flowing material continues to be exposed to wear, and breakdowns entail the risk of great damage to the reactor and the bed. The economic efficiency of the previously known reactor is limited by the relatively frequent changing of the bed and by repair work to eliminate damage occurring during operation.

While there are materials (e.g., ceramics or thick metal alloys) which do not undergo appreciable thermal expansion, such materials are typically not suitable for the manufacture of catalyst baskets. The basket must be fluid permeable and ceramics or heavy metal alloys cannot readily be punched (i.e., perforated) to provide suitable fluid passages.

SUMMARY OF THE INVENTION

An object of the invention, therefore, is to provide a reactor of the type previously mentioned which is reliable, permits economical operation, and especially largely avoids damage to the free-flowing material and reactor during both normal operation and interruptions of operations.

Upon further study of the specification and appended claims, further objects and advantages of this invention will become apparent to those skilled in the art.

These objects are achieved by providing for at least one of the two baskets, which define the bed of free-flowing material, to be expandable in the axial direction, yet be rigidly connected to the reactor shell at the upper end of the basket.

The baskets have, therefore, the capability of compensating for thermal expansion with little or no strong stress forces occurring (i.e., they possess expandibility) The invention thus provides baskets which, for example, function analogously to spiral springs. Spiral springs can be compressed and extended in the axial direction (axial expandable) but not in the radial direction (radially rigid).

The pair of terms "rigid" and "expandable" do not refer to mechanical properties inherent in the material itself, such as elasticity or temperature variation, but to the possibility of changes in the form of the material, in this case, a basket. A body, rigid in a certain direction, in this sense is still capable of form changes, e.g., as a result of temperature changes. For example, a corrugated sheet is rigid in the direction of the furrows and expandable in the direction perpendicular to them. A corrugated sheet, bent on a cylinder shell in which the furrows run in circles around the cylinder axis, is expandable in the axial direction and rigid in the tangential and thus also in the radial direction.

The design of the invention is intended to avoid, to the greatest extent possible, relative movement in the axial direction between the free- flowing material of the bed and at least one of the baskets. This is achieved by two features. Firstly, the rigid fastening of the basket on both ends causes the geometric length of the basket to be established practically independent of the temperature conditions inside the reactor. This length is determined by the height of the shell, which itself is hardly exposed to temperature changes. The ends of the basket are hindered by this rigid fastening from temperature-induced movements. Secondly, the axial expandability of the basket absorbs the expansion of the material in temperature increases over the entire length of the basket so that temperature-dependent shifts cannot occur at any point.

The baskets can be given the ability to absorb axial expansion by, for example, (1) prestressing the baskets during production of the reactor so they are capable of absorbing compressive forces and/or (2) providing vertically aligned rows of perforations so that the baskets can absorb compressive forces by deformations of the perforations.

Avoidance of shifts, in turn, means that—even at great temperature fluctuations—practically no relative movements between bed and basket occur, and the reactor can thus be especially reliably operated. The increase of reliability causes an extensive avoidance of breakdowns and thus, on the whole, a high economic efficiency of the reactor.

With the help of this design, it is possible to handle the temperature differences in catalytic and adsorption processes without troublesome relative movements occurring. Of course, for this purpose, the baskets are made of a suitable material with an expansion coefficient which is in a specific ratio to that of the free-flowing material, and the basket sheets are in suitable form, approximately the type described in the embodiment of the drawings. The ratio of the expansion coefficients (baskets to free-flowing material) is generally about 0.25–2.0, preferably 1.0–2.0.

In the prior art, complicated and expensive technical measures are used to convert the thermal length change of the material of the baskets into an expansion of the entire basket and thus even promote the relative movement between bed and basket. Conversely, in the reactor according to the invention, the undesirable relative movement is prevented by a substantially less complicated design. Extensive tests and calculations have shown that contrary to previously harbored fears, it is entirely possible to handle temperature differences of up to about 300 K without damage to the reactor and/or bed.

According to a favorable development of the invention, at least one basket, rigidly connected at its upper end to the shell, is prestressed in the axial direction. If both baskets are to be solidly clamped, i.e., rigidly connected to the shell at the top and bottom, then preferably both baskets are prestressed.

While mounting the basket(s) within the shell, first either the upper or lower end of the basket(s) is rigidly connected to the shell. Thereafter, a tensile stress is imposed on the basket and the other end thereof is rigidly connected to the shell. The prestressing is therefore performed at normal temperatures (e.g., about 20° C.). The amount of prestressing is preferably chosen so that about half of the expected thermal expansion at the highest possible temperature of normal operation can be absorbed by diminution of the prestress. The remainder should therefore be compensated by the axial expandability of the basket(s).

During assembly of the reactor, which takes place at ambient temperature, the basket or baskets are optionally put under axial stress. The extent of the prestress is determined by the level of the temperature gradient within the bed which will occur during operation. When raising the temperature, for instance, by heated regeneration gas, the temperature variation of the material is first absorbed by a reduction of the prestress. Only at higher temperatures is the prestress completely removed and the expansion of the material caused by temperature must be absorbed as compression by the axial expandability of the form of the basket. In this manner, the pressure forces acting in the axial direction are considerably reduced and also a more reliable operation of the reactor at higher temperature is assured.

BRIEF DESCRIPTION OF THE DRAWINGS

Various other objects, features, and attendant advantages of the present invention will become more fully appreciated as the same becomes better understood when considered in conjunction with the accompanying drawing, wherein.

DETAILED DESCRIPTION OF THE DRAWINGS

Figure 1:
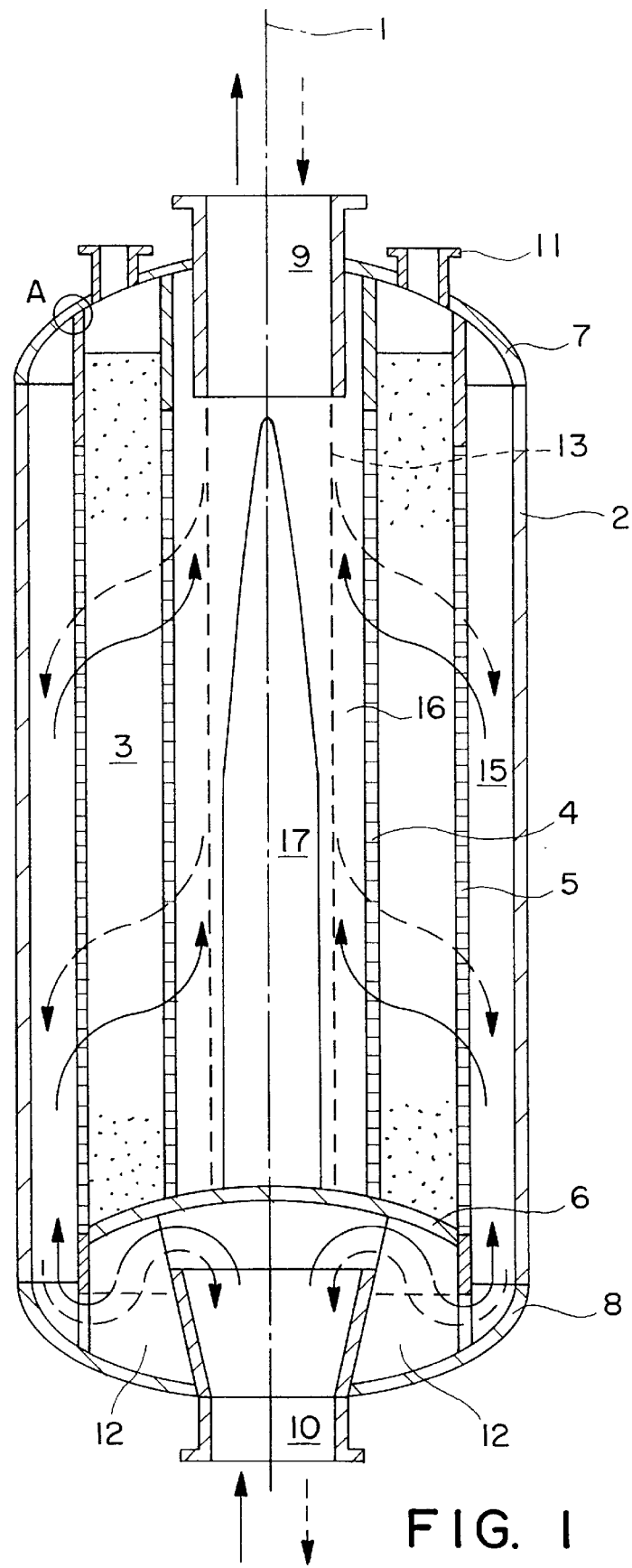
FIG. 1 illustrates a simplified representation of a sectional view of a reactor according to invention along a plane containing the axis of symmetry.

FIG. 1 shows the basic structure of an exemplary embodiment of a reactor according to the invention with its essential features. For simplicity's sake, the representation is made very diagrammatically. Thus, the ratios between the outside dimensions of the reactor and the material thicknesses especially do not correspond to actual measurements.

The reactor is essentially designed cylindrically symmetrically around essentially vertical axis 1. It is bounded by an external shell 2 which has upper 7 and lower 8 hemispherical caps. The lower cap 8 has, for example, an inlet opening 10 and the upper cap 7 has an outlet opening 9 to permit the flow of a gas to be treated, e.g., purified.

Inside the reactor there is positioned an annular adsorption bed 3, which is bounded or limited by two baskets 4 and 5. Bed 3 is closed at its lower end from below by bottom support member 6 which is rigidly fastened to the lower hemispherical cap 8 of shell 2 by ribs 12 arranged like a star. Inner basket 4 is rigidly connected at its lower end to bottom support member 6 and further supported on lower hemispherical cap 8 of shell 2 by ribs 12 arranged like a star. Outer basket 5 stands on lower spherical cap 8, is welded to it, and thus is rigidly connected to shell 2.

Baskets 4, 5 are made mostly of perforated sheet. The perforations are indicated in FIG. 1 by horizontal lines (not according to scale). Unperforated sheet is used only at the ends of the baskets. Details on the structure of baskets 4, 5 are to be described further with respect to FIGS. 2 and 3.

Bed 3 is made up of free-flowing material. In the present description, the reactor contains a bed of an adsorptive material, but a bed of free-flowing catalyst could be used just as well.

The direction of flow of the gas to be purified is indicated in FIG. 1 by arrows with solid lines (reaction or adsorption phase). In the present case, the gas to be purified, for example, air flows into the reactor through inlet opening 10 and is deflected by the underside of bottom support member 6. In this way, droplets of condensed water vapor are formed and separated from the gas. Then the gas to be purified is conducted into an exterior annular space 15 between shell 2 and outer basket 5. From there, the gas to be purified flows radially through adsorption bed 3 into an inner cylindrical space 16 formed by inner basket 4. Positioned in space 16 is a displacer 17 in the form of a frustrum, which reduces the cross section of the inner cylindrical space 16. Thus, an approximately uniform stream density of the gas to be purified in bed 3 is assured largely independent of the axial coordinates. If necessary, a dust sieve 13 can be provided between inner basket 4 and displacer 17.

If during the process a regeneration of the bed material is necessary, a regeneration phase can be instituted during which a regeneration gas, for example, nitrogen, is fed in the reverse direction (arrows with broken lines in FIG. 1).

Figure 2:
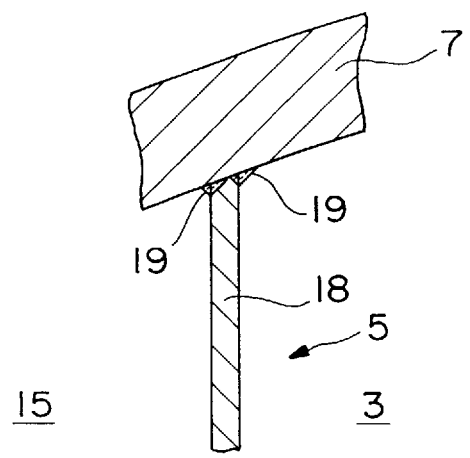
FIG. 2 illustrates cut-away A from FIG. 1 in detail.

FIG. 2 illustrates cutout A from FIG. 1 in detail. In this figure, the upper fastening of outer basket 5 to upper hemispherical cap 7 of shell 2 can be seen. The upper part of outer basket 5, made from unperforated sheet 18, is rigidly connected by two circular welding seams 19 to upper spherical cap 7. With this type of construction, inner basket 4 is welded in the same way to upper hemispherical cap 7 of shell 2. Fastening of the lower ends of -inner basket 4 and outer basket 5 to the lower hemispherical cap 8 is analogously accomplished.

Long, drawn-out perforations 25 (for example, oval-shaped) in perforated sheet 20 are placed regularly in circles around the axis of symmetry 1. Sheet 20 represents the perforated portion of the sheets forming the baskets 4 and 5. The dimensions of the perforations and their configuration are determined as a function of the temperature gradient to be expected. In the present example, the perforation width is about 3 mm, the perforation length is about 30 mm, and the web width (lateral distance between perforations of two adjacent circles of perforations) is about 6 mm (see FIG. 3). Generally, the ratio of horizontal length to vertical width is about 10–25 and the distance between perforations of adjacent circles of perforations is about 1.5–6 times the vertical width of the perforations. If the particle size of the bed material is smaller than the perforation width, then both baskets 4, 5 can be provided with a wire net 22 on their side turned toward the inside of bed 3, as is illustrated in FIG. 3 for outer basket 5.

The configuration of perforated sheet 20 establishes important properties of the baskets with respect to the invention. This is explained by the developed view shown in FIG. 3. The horizontal in the drawing corresponds to a tangential direction around the axis of symmetry of the reactor, and vertical corresponds to the axial direction. Between two rows of perforations, the perforated sheet exhibits continuous webs in the tangential direction. Thus, along the direction of these webs, the sheet acts like an unperforated sheet. In this sense, the perforated sheets 20 acts rigidly in the tangential direction. The basket part, which consists essentially of a cylindrically shaped perforated sheet, is thus radially rigid. In the axial direction, perforated sheet 20 does not exhibit any continuous webs in a straight line but again and again is interrupted by perforations. Therefore, in this direction, it is compressible and extensible. Forces applied in the axial direction can be absorbed not only by the elasticity of the material, but also by change of the form of perforated sheet 20, for instance, by distortion of the shape of perforations 25. The basket is thus axially expandable in the meaning defined above.

Figure 3:
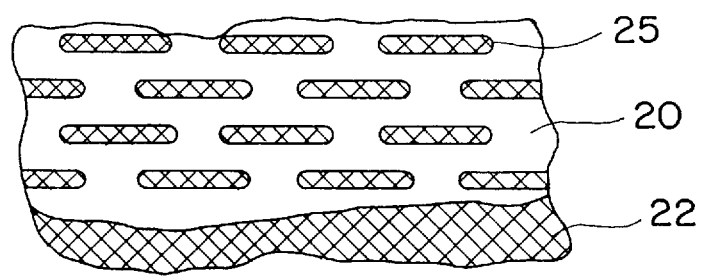
FIG. 3 illustrates a detailed view of a portion of a basket for use in the invention.
Figure 4:
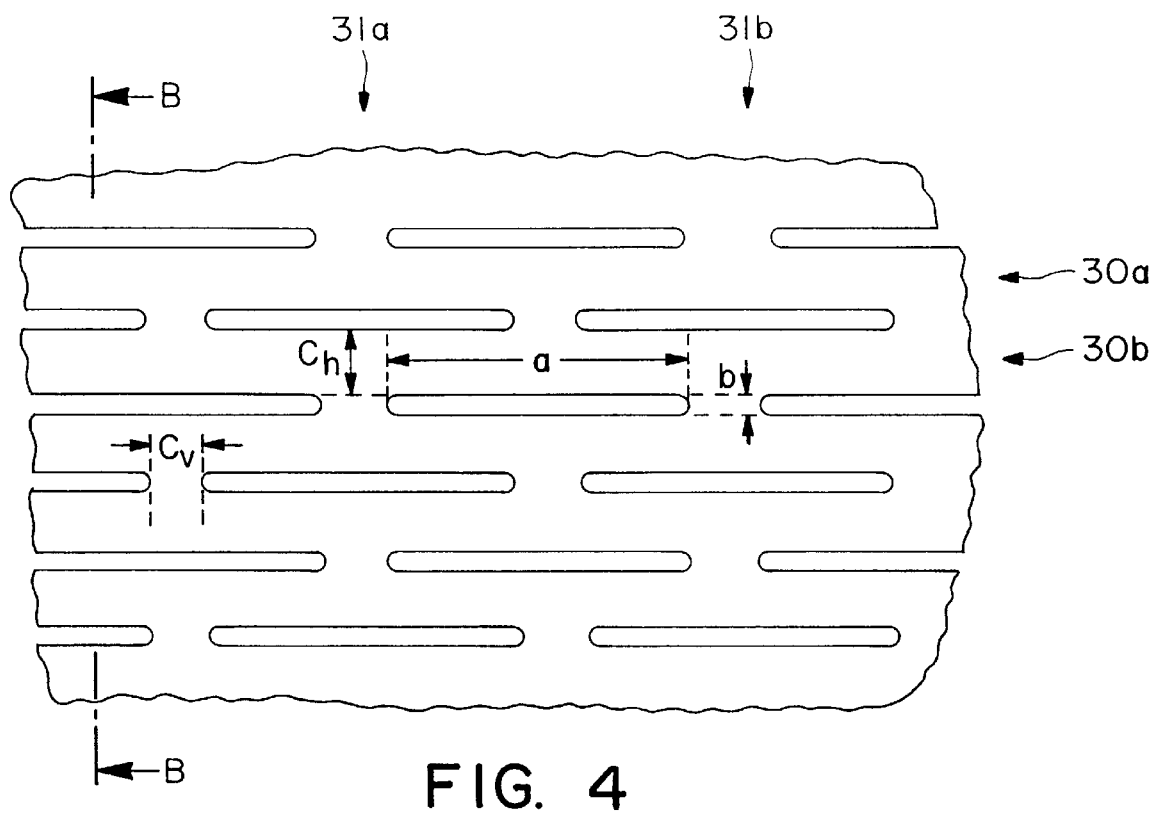
FIG. 4 illustrates a variation of the embodiment of FIG. 3.
Figure 5:
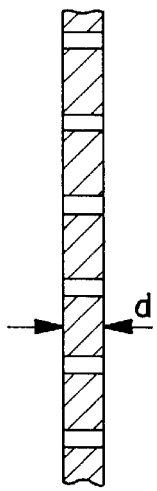
FIG. 5 illustrates a cross-section of FIG. 4 along line B—B.

FIGS. 4 and 5 show an embodiment of baskets, which is a variation of the embodiment of FIG. 3. FIG. 4 is a projection of a section of the cyclindrical wall of a basket; FIG. 5 is a cross-sectional view along axial line B—B. The axis of symmetry of the reactor runs vertically in the Figures.

Both types of baskets (FIG. 3 and FIGS. 4 and 5) are made from perforated metal sheets with a thickness, d, of about 2–10, preferably 2.5–6.0 mm. The perforations are elongated along the horizontal and lie along horizontal circles around the axis of symmetry. Between each pair of adjacent circles, there is a vertically continuous bridge (30*a*, 30*b*) which is not interrupted by any perforation.

As shown in FIG. 4, the perforation of two adjacent circles are arranged in a staggered formation so that there is not any continuous bridge in the axial (i.e., vertical) direction (arrows 31*a*, 31*b*). The basket according to FIGS. 4 and 5, therefore is, in the meaning of the invention, rigid along the circles (i.e., in the radial direction), and expandable in the axial direction. These features are caused by the special geometry of the perforations and are, qualitatively, identical in both embodiments. Quantitative differences, however, exist in the dimensions of the perforations, as set forth below.

Basket of FIG. 3
 (i) perforation length, a:
  20–50 mm, preferably 25–35 mm
 (ii) perforation width, b:
  2.0–5.0 mm, preferably 2.5–3.5 mm (
 iii) horizontal bridge width, $c_h$:
  4.0–8.0 mm, preferably 5.0–7.0 mm
 (iv) vertical bridge width, $c_v$:
  5.0–20 mm, preferably 8.0–12.0 mm Basket of FIGS. 4 and 5
 (i) perforation length, a:
  10–40 mm, preferably 20–30 mm
 (ii) perforation width, b:
  0.8–2.0 mm, preferably 1.0–1.5 mm
 (iii) horizontal bridge width, $c_h$:
  3.0–10 mm, preferably 4.0–6.0 mm
 (iv) vertical bridge width, $c_v$:
  3.0–12 mm, preferably 5.0–7.0 mm A special example of the basket embodiment according to FIGS. 4 and 5 has the following proportions:
 a=25 mm b=1.2 mm $c_h$=5.0 mm
 $C_v$=6.0 mm d=4.0 mm Because of the smaller size of the perforations of the second embodiment, a fine-meshed wire net 22, as shown in FIG. 3, may be dispensable, the perforated sheet itself sufficiently retaining the adsorptive or catalytic particles.

Figure 7:
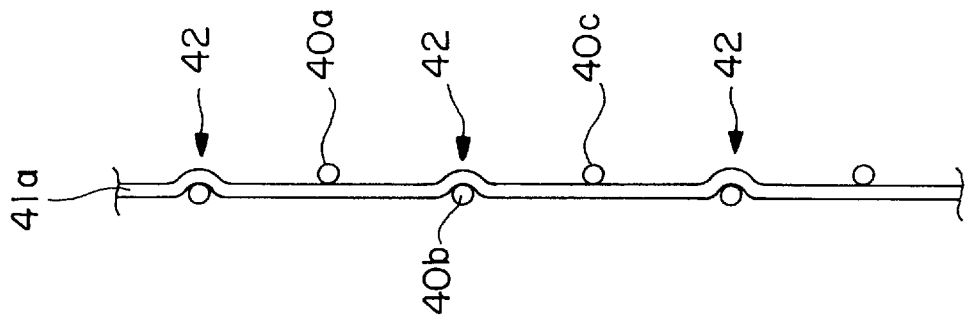
FIG. 7 illustrates a cross-section of FIG. 6 along line C—C.
Figure 6:
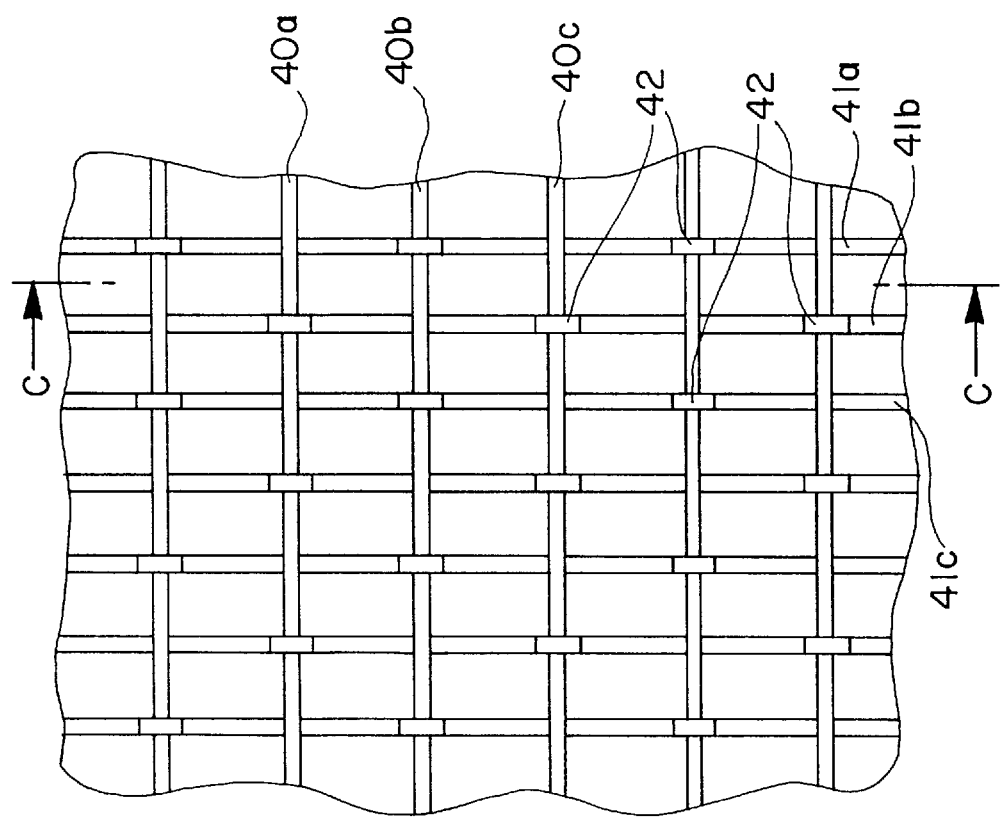
FIG. 6 illustrates an embodiment of the invention wherein the basket comprises a wire web.

FIGS. 6 and 7 show a third version of the basket in accordance with the invention. It is constructed in a substantially different manner, i.e., as a wire web.

Circles of horizontal wires 40a, 40b, 40c are interwoven with vertical (axial) wires 41a, 41b, 41c. The horizontal wires 40a, 40b, 40c exhibit no essential bendings and thus effect the radial rigidity of the basket (similar to the continuous bridges of the preceding examples). The vertical (axial) wires 41a, 41b, 41c, however, are provided with outward bendings, so-called articulations, in regular distances of, e.g., a double web width. These bendings are capable of changing form to eliminate stress forces in the vertical (i.e., axial) direction, e.g., caused by thermal expansion.

By its special texture, the basket is radially rigid and axially expandable within the meaning of the invention. These features can be strengthened by the materials chosen for the wires, preferably invar steel for the horizontal wires 40a, 40b, 40c and CrNi steel for the vertical (axial) wires 41a, 41b, 41c. The thickness of the wires is about 1.0–10 mm, preferably 1.0–5.0 mm, most preferably 2.0–3.0 mm; the web width is about 3.0–20 mm, preferably 6–12 mm.

Because, in general, the web width is too large to retain the adsorptive or catalytic particles, a fine-meshed wire net is placed at the inner side (on the left side in FIG. 7) of the wire web (not shown in FIGS. 5 and 6). Inside the reactor, the wire web has the same length as the bed of active material. Above and below the bed, the basket is connected rigidly with the shell by unperforated metal sheets, similar to FIG. 1.

While the above description is directed to an adsorption or absorption process, the invention is also suitable for use in catalytic reaction processes such as catalytic removal of $NO_x$ from the flue gases of combustion operations using, e.g., metal-doped molecular sieves as the catalyst.

The entire disclosures of all applications, patents. and publications cited above and of corresponding West German Application P 39 19 750.6, filed Jun. 16, 1989, are hereby incorporated by reference.

From the foregoing description, one skilled in the art can easily ascertain the essential characteristics of this invention, and without departing from the spirit and scope thereof, can make various changes and modifications of the invention to adapt it to various usages and conditions.

What is claimed is:

1. A reactor comprising:

a cylindrically shaped shell disposed symmetrically about an essentially vertical axis, said shell having a lower end and an upper end;

an annular bed of free-flowing material positioned within said shell, said bed having a lower end and an upper end;

said bed being bounded by a substantially cylindrical outer basket of a first diameter and a substantially cylindrical inner basket of a second diameter, wherein said first diameter is greater than said second diameter, and wherein each of said outer basket and inner basket have an upper end and a lower end;

each of said inner and outer baskets having a perforated region through which fluid can flow, said perforated region of said inner basket and said perforated region of said outer basket being in contact with said free-flowing material of said bed, and said perforated region of said inner basket and said perforated region of said outer basket each having an upper edge and a lower edge;

said bed being supported at its lower end by a bottom support member and each of said baskets being rigid in the radial direction and rigidly connected at their lower ends to said shell; and wherein at least one of said inner basket and said outer basket is rigidly connected at its upper end to said shell, whereby the upper and lower ends thereof and the upper and lower edge of the respective perforated region thereof are fixed relative to said shell, and possesses expandability in the direction of said essentially vertical axis whereby thermal expansion thereof is absorbed.

2. A reactor according to claim 1, wherein said free-flowing material is a particulate adsorbent.

3. A reactor according to claim 1, wherein said free-flowing material is a particulate catalyst.

4. A reactor according to claim 1, wherein:

the baskets comprise perforated sheets which form said perforated regions, said perforated sheets having perforations in circular rows around said essentially vertical axis and the regions between adjacent circular rows constitute circular unperforated webs functioning rigidly in a direction which is tangential to said sheets, which permit the baskets to be vertically compressible and expandable.

5. A reactor according to claim 1, wherein:

a plurality of annular beds of free-flowing material are positioned within said shell, each of said beds being bounded by substantially cylindrically inner and outer baskets which are supported at their lower ends by a bottom support member and are rigidly connected to said shell at their lower end; and at least one of said baskets for each of said beds is expandable in the axial direction, rigid in the radial direction and rigidly connected at its upper end to said shell.

6. A reactor according to claim 1, wherein the ratio of the expansion coefficient of said baskets to the expansion coefficient of said free-flowing material is 0.25–2.0.

7. A reactor according to claim 1, wherein said free-flowing material is adsorptive material.

8. A reactor according to claim 1, wherein said free-flowing material is a catalyst.

9. A reactor according to claim 1, wherein said inner basket being rigidly connected at its lower end to said bottom support member and said bottom support member being rigidly connected to said shell.

10. A reactor according to claim 1, wherein both baskets are both expandable in the direction of said essentially vertical axis and rigidly connected at their upper ends to said shell.

11. A reactor according to claim 10, wherein both baskets are prestressed in the direction of said essentially vertical axis.

12. A reactor according to claim 10, wherein:

the baskets comprise perforated sheets which form said perforated regions, said perforated sheets having perforations in circular rows around said essentially vertical axis and the regions between adjacent circular rows constitute circular unperforated webs functioning rigidly in a direction which is tangential to said sheets, which permit the baskets to be vertically compressible and expandable.

13. A reactor according to claim 10, wherein at least one of said baskets is prestressed in the direction of said essentially vertical axis.

14. A reactor according to claim 1, wherein said at least one basket rigidly connected at its upper end to said shell is prestressed in the direction of said essentially vertical axis.

15. A reactor according to claim 1, further comprising means to permit radial flow through said annular bed.

16. A reactor according to claim 15, wherein said inner basket also defines an inner cylindrical space which contains a frustrum-shaped displacer to provide uniform radial flow within the reactor.

17. A reactor according to claim 15, wherein:

said shell is provided at its lower end with a first fluid passage means capable of permitting the introduction or discharge of fluid, said first fluid passage means being in fluid communication with a space defined by the inner surface of said reactor shell and the outer basket, and said shell also being provided at its upper end with a second fluid passage means capable of permitting the introduction or discharge of fluid, said second fluid passage means being in fluid communication with an inner cylindrical space defined by said inner basket.

18. A reactor according to claim 1, wherein said baskets have perforations which are capable of deforming and thereby preventing formation of stress forces in the direction of said essentially vertical axis induced by thermal expansions.

19. A reactor according to claim 18, wherein said upper and lower ends of each of said baskets are unperforated sheets and a middle region between said upper and lower ends is a perforated sheet which forms said perforated region of each of said baskets.

20. A reactor according to claim 19, wherein said perforated sheets contains circular rows of perforations around said essentially vertical axis.

21. A reactor according to claim 20, wherein said perforations are of oval shape.

22. A reactor according to claim 21, wherein said oval-shaped perforations have a minor vertical axis and a major horizontal axis.

23. A reactor according to claim 22, wherein the ratio of said major horizontal axis of each perforation to its minor vertical axis is about 10–25 and the distance in the direction of said essentially vertical axis between perforations of two adjacent circles of perforations is about 1.5–6 times said minor vertical axis of each perforation.

24. A reactor according to claim 23, wherein said perforations have a vertical width of about 3 mm, a horizontal length of about 30 mm, and the vertical distance between perforations of two adjacent circles of perforations is about 6 mm.

25. A process for preventing the formation of stress induced by thermal expansion within a radial flow reactor containing an annular bed of free-flowing material, said bed being bounded by a substantially cylindrical outer basket of a first diameter and a substantially cylindrical inner basket of a second diameter, wherein said first diameter is greater than said second diameter, and wherein each of said baskets has a lower end and an upper end, each of said inner and outer baskets having a perforated region through which fluid can flow, said perforated region of said inner basket and said perforated region of said outer basket being in contact with said free-flowing material of said bed, and said perforated region of said inner basket and said perforated region of said outer basket each having an upper edge and a lower edge, said process comprising:

rigidly connecting the lower ends of each of said baskets to said shell; and providing for at least one of said baskets to be expandable in the axial direction, rigid in the radial direction and rigidly connected at its upper end to said shell, whereby the upper and lower ends thereof and the upper and lower edge of the respective perforated region thereof are fixed relative to said shell, and possesses expandability in the direction of said essentially vertical axis whereby thermal expansion thereof is absorbed.

26. A reactor comprising:

a cylindrically shaped shell disposed symmetrically about an essentially vertical axis, said shell having a lower end and an upper end;

an annular bed of free-flowing material positioned within said shell, said bed having a lower end and an upper end;

said bed being bounded by a substantially cylindrical outer basket of a first diameter and a substantially cylindrical inner basket of a second diameter, wherein said first diameter is greater than said second diameter, and wherein each of said outer basket and inner basket have an upper end and a lower end;

said bed being supported at its lower end by a bottom support member and each of said baskets being rigid in the radial direction and rigidly connected at their lower ends to said shell; and wherein at least one of said inner basket and said outer basket is rigidly connected at its upper end to said shell and thermal expansion of said at least one basket is absorbed thereby via reduction of prestress induced in said basket, compression of said basket in the direction of said essentially vertical axis, or both.

27. A reactor comprising:

a cylindrically shaped shell disposed symmetrically about an essentially vertical axis, said shell having a lower end and an upper end;

an annular bed of free-flowing material positioned within said shell, said bed having a lower end and an upper end;

said bed being bounded by a substantially cylindrical outer basket of a first diameter and a substantially cylindrical inner basket of a second diameter, wherein said first diameter is greater than said second diameter, and wherein each of said outer basket and inner basket have an upper end and a lower end;

said bed being supported at its lower end by a bottom support member and each of said baskets being rigid in the radial direction and rigidly connected at their lower ends to said shell; and wherein at least one of said inner basket and said outer basket is also rigidly connected at its upper end to said shell thereby having a substantially fixed length and possesses expandability whereby thermal expansion of said at least one basket is absorbed over the entire length thereof.

* * * * *